United States Patent [19]

Fukuda et al.

[11] Patent Number: 5,006,591
[45] Date of Patent: Apr. 9, 1991

[54] POLYARYLENE THIOETHER COMPOSITION AND MOLDED PRODUCT THEREOF

[75] Inventors: Makoto Fukuda; Ken Kashiwadate; Toshitaka Kouyama; Zenya Shiiki, all of Iwaki, Japan

[73] Assignee: Kureha Kagaku Kogyo Kabushiki Kaisha, Tokyo, Japan

[21] Appl. No.: 325,008

[22] Filed: Mar. 17, 1989

Related U.S. Application Data

[63] Continuation of Ser. No. 104,990, Oct. 6, 1987, abandoned.

[30] Foreign Application Priority Data

Oct. 9, 1986 [JP] Japan .................................. 61-241047

[51] Int. Cl.$^5$ .............................................. C08L 81/04
[52] U.S. Cl. ................................... 524/502; 524/609; 525/189
[58] Field of Search .......................... 525/189; 524/502

[56] References Cited

U.S. PATENT DOCUMENTS

| | | | |
|---|---|---|---|
| 4,134,874 | 1/1979 | Needham | 524/431 |
| 4,476,284 | 10/1984 | Cleary | 525/189 |
| 4,544,700 | 10/1985 | Wright | 524/424 |
| 4,581,411 | 4/1986 | Liang et al. | 525/189 |
| 4,607,059 | 8/1986 | Kmiec et al. | 521/180 |
| 4,645,826 | 2/1987 | Iizuka et al. | 525/537 |

FOREIGN PATENT DOCUMENTS

41553 9/1979 Australia.
166451 2/1986 European Pat. Off..

*Primary Examiner*—John C. Bleutge
*Assistant Examiner*—David W. Woodward
*Attorney, Agent, or Firm*—Oblon, Spivak, McClelland, Maier & Neustadt

[57] ABSTRACT

The present invention discloses a polyarylene thioether composition prepared by blending a polyarylene thioether and a polyisobutylene as an impact modifier having a compatibility with polyarylene thioether and capable of withstanding a high processing temperature for the polyarylene thioether. The composition can be processed into a molded product excellent in toughness and impact resistance.

11 Claims, 2 Drawing Sheets p-1 p-3 p-5 p-9

POLYARYLENE THIOETHER COMPOSITION AND MOLDED PRODUCT THEREOF

This application is a continuation of application Ser. No. 104,990, filed on Oct. 6, 1987, now abandoned.

BACKGROUND OF THE INVENTION

The present invention concerns a composition of polyarylene thioether (hereinafter simply referred to as PATE) improved in toughness and impact resistance and a molded product thereof. More specifically, the present invention relates to a composition of PATE and polyisobutylene (hereinafter simply referred to as PIB), as well as a molded product thereof.

PATE has been used in recent years as a crystalline thermoplastic resin excellent in heat resistance, moldability, chemical resistance, flame retardancy and rigidity. However, it has still been insufficient in toughness, impact resistance, etc. and improvement therefor has strongly been wanted.

As a method of solving the problems on the toughness and impact resistance, several attempts have been tried for the method of melt-blending PATE with an impact modifier. However, since the melt processing temperature for PATE is extremely high, conventional impact modifiers such as natural rubber, SBR, NBR, isoprene rubber or modified product thereof are liable to be thermally degraded upon melt-blending since they contain many thermally degradable aliphatic double bonds in their molecule chain, and, accordingly, are not suitable as the material for improving toughness and impact resistance of PATE.

Although an acrylic rubber type modifier has substantially no aliphatic double bonds in its molecular chain, it is not satisfactory as an impact modifier to improve toughness and impact resistance of PATE, since its ester bonds, etc. are also liable to be thermally degraded upon melt-blending.

Modifiers which are heat resistant rubber such as fluoro rubber type and silicone rubber type, show less thermal degradation upon melt-blending, but they have been extremely uneconomical since they are expensive and show less improving effect when added in a small amount.

Olefinic rubber type modifiers such as EPR show less thermal degradation since they contain substantially no aliphatic double bonds and their costs are relatively inexpensive, but their effect to improve toughness and impact resistance of PATE is low due to an extremely poor compatibility with PATE. In addition, there has also been a problem that the appearance of the molded product obtained by using them tends to be poor.

The present inventors have made an extensive study on the method of improving toughness and impact resistance of PATE effectively and economically and, as a result, have found that toughness and impact resistance of PATE can be improved remarkably by properly adding PIB, which is an inexpensive rubbery high polymer, as a modifier. It has surprisingly been found that the effect is particularly significant when PIB is used in combination with a fibrous filler such as glass fibers. It is estimated that PIB acts not only as an elastic absorbent for impact energy or stress but also acts as a sort of a coupling agent at the interface between the fibrous filler and the PATE matrix (judged from microscopic observation, etc.). Furthermore, it has also been found that humidity proofness, etc. can also be improved as an additional effect. The present invention has been accomplished based on these findings.

SUMMARY OF THE INVENTION

The object of the present invention is to provide a PATE composition capable of producing a molded product having excellent toughness and impact resistance when fabricated.

Another object of this invention is to provide a composition of PATE containing a novel impact modifier capable of withstanding the high processing temperature of PATE, having good compatibility with PATE and relatively inexpensive.

The further object of the present invention is to provide a composition comprising PATE, PIB, as an impact modifier for PATE, and fibrous filler and/or inorganic powdery filler blended therewith, as well as a molded product prepared by fabricating said composition.

The still further object of the present invention is to provide a molded product with improved humidity proofness suitable to an application use such as packaging materials.

DETAILED DESCRIPTION OF THE INVENTION

Figure 1:
FIGS. 1 and 2 are the pictures of scanning electron microscope of the fractured test pieces. Each picture, P-1 and P-3 of FIG. 1 and P-5 and P-9 of FIG. 2, corresponds to the test piece of Code Number of 1, 3, 5, or 9 of Table 1, respectively.
Figure 1:
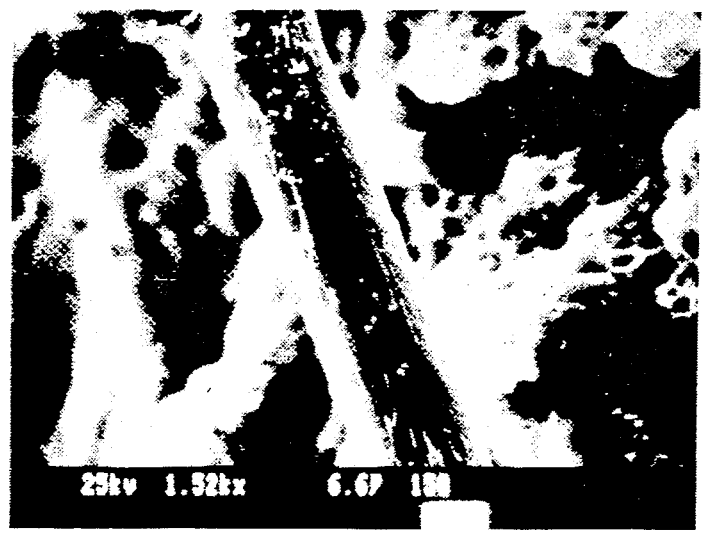
Figure 2:
Figure 2:
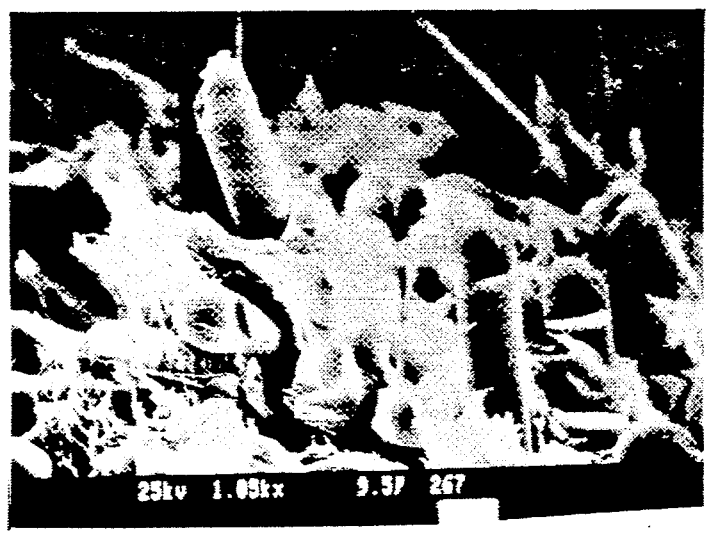

The PATE composition according to the present invention comprises the following ingredients (A) and (B):

| (A) PATE | 100 parts by weight |
|---|---|
| (B) PIB | 0.3–70 parts by weight |

Another PATE composition according to the present invention comprises the following ingredients (A), (B) and (C):

| (A) PATE | 100 parts by weight |
|---|---|
| (B) PIB | 0.3–70 parts by weight |
| (C) Filler | up to 400 parts by weight based on 100 parts by weight of (A) + (B) |

Furthermore, the molded product according to the present invention comprises a PATE composition comprising the following ingredients (A) and (B).

| (A) PATE | 100 parts by weight |
|---|---|
| (B) PIB | 0.3–70 parts by weight |

Further, another molded product according to the present invention comprises a PATE composition comprising the following ingredients (A), (B) and (C):

| (A) PATE | 100 parts by weight |
|---|---|
| (B) PIB | 0.3–70 parts by weight |
| (C) Filler | up to 400 parts by weight based on 100 parts by weight of (A) + (B) |

Regarding the first PATE composition and the composition for the molded products described above, the expression : "comprising the ingredients (A) and (B)" means that it includes, in addition to the composition consisting only of the ingredients (A) and (B), those compositions further containing various kinds of auxiliary materials customarily used in the usual thermoplastic resin compositions, for instance, various types of stabilizers, releasing agents, flame retarding agent, antistatic agents, antioxidants, antirust agent, coupling agents, lubricants, pigments, foaming agents and other auxiliaries, as well as synthetic resins and elastomers.

The second PATE composition and the composition for the molded product correspond to a composition containing fibrous filler and/or inorganic powdery filler as one of such auxiliary materials.

PATE

Generally, PATE means a polymer having a repeating unit of (Ar—S— (Ar : arylene group) as the constituent element and PATE used in the present invention has p-phenylene group as arylene group as the main constituent. The expression "as the main constituent" in the present invention means that the repeating unit of

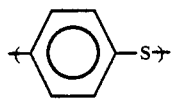

is contained not less than 60 mol% and, preferably, not less than 75 mol% of the total repeating unit of (Ar-(-S-)-.

Those having p-phenylene group as the main constituent of arylene group are preferred in view of the physical properties such as heat resistance, moldability and mechanical properties.

Arylene groups other than p-phenylene group as the main constituent usable herein can include, for example, m-phenylene group (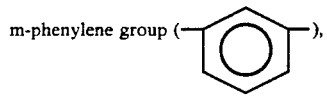), o-phenylene group (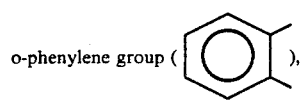), alkyl-substituted phenylene group (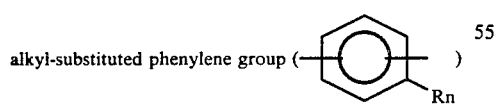)

(in which R is an alkyl group, preferably, a lower alkyl group and n is an integer of 1 to 4), p,p'-diphenylenesulfone group (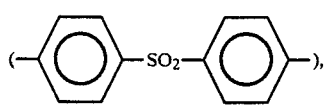), -continued p,p'-biphenylene group (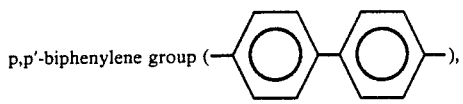), p,p'-diphenylene ether group (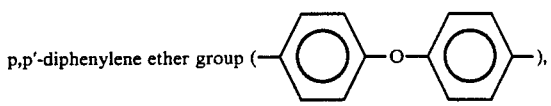), p,p'-diphenylene carbonyl group (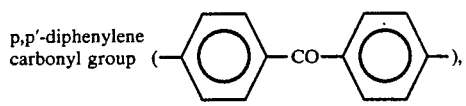), naphthalene group (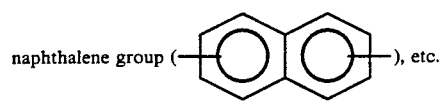), etc.

From the view point of processability, copolymer containing different kind of repeating units are excellent in most cases than homopolymers consisting only of the repeating units of ⟨⟩—S⟩. As the copolymer, a copolymer of ⟨⟩—S⟩ and ⟨⟩—S⟩ is preferred. Particularly, those containing the respective repeating units in a block form is preferred to those containing them in a random form (for example, as described in EPC Application Laying Open No. 166451), because use of the block-copolymer is remarkably excellent in physical properties (heat resistance, mechanical property, etc.) although they are substantially equal in the processability. 5 to 40 mol% of repeating unit of ⟨⟩—S⟩, namely, 95 to 60% mol % of repeating unit of ⟨⟩—S⟩, in the block copolymer is preferable. Particularly, 10 to 25 mol % of repeating unit of

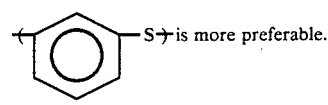 is more preferable.

As the PATE in the present invention, those having substantially linear structure are preferred in respect to the processability and the physical property. However, crosslinked products obtained by using a small amount of a crosslinking agent (for example, 1,2,4-trihalobenzene) upon polymerization within a range not impairing the processability and the physical property may also be used.

Although cured PATEs can be used as a polymer in the present invention, uncured PATEs are more preferable.

Since cured PATEs contain many branched or crosslinked structures, its use involves various problems in respect to physical properties of the molded products and a processability of the composition, such a poor mechanical strength, severe discoloration and low heat stability upon melt processing.

PATE with the melting point higher than 250° C. is preferable for the present invention. If the melting point is lower than 250° C., the major feature as a heat resistant polymer is impaired.

The preferable PATE for the present invention can be manufactured economically by the process described in U.S. Pat. No. 4,645,826 filed by the present inventors. In addition, a method described in U.S. Pat. No. 3,919,177 in which a polymerization aid such as a carboxylic acid salt is added in a large amount to obtain a high molecular weight PATE can also be used. However, the latter method is disadvantageous from an economical point of view.

Modifier

The modifier to be used in the present invention to improve toughness and impact resistance of PATE is PIB. In the present invention, "PIB" means a polymer having the repeating unit of $-(CH_2-C(CH_3)_2)-$ as the main constituent, which may have a crosslinked structure or not.

PIB usable in the present invention can be the one containing repeating unit of $-(CH_2-C(CH_3)_2)-$ by not less than 60 mol%, preferably, not less than 80 mol% and, particularly preferably, not less than 90 mol%. However, those containing a considerable amount of aliphatic double bonds in the molecular chain are not preferred since they are liable to cause thermal degradation upon melt-blending with PATE. The permissible content of the aliphatic double bond of

(in which $R^1$, $R^2$ = H or a hydrocarbon group) in the polymer is not more than 5 mol%, preferably, not more than 2 mol% and, particularly preferably, not more than 1 mol%.

The molecular weight of the PIB as the modifier in the present invention has molecular weight, of 5,000 to 500,000 and, preferably, 10,000 to 400,000. If the molecular weight is less than 5,000, the effect of improving the impact resistance may possibly become insufficient, whereas if it exceeds 500,000, it becomes difficult to disperse uniformly in PATE. Either way is not desirable.

The molecular weight as described above is determined by the conventional method based on the solution viscosity using diisobutylene (measuring temperature: 40° C).

The amount of PIB mixed in PATE is within a range of 0.3 to 70 parts by weight, preferably, 1 to 50 parts by weight and, particularly preferably, 3 to 30 parts by weight based on 100 parts by weight of PATE. If it is less than 0.3 part by weight, the effect of improving toughness and impact resistance may possibly become insufficient, whereas if it exceeds 70 parts by weight, physical properties of the composition such as heat resistance, flame retardancy and rigidity may significantly be degraded, which are not desirable.

The PIB used in the present invention is preferably stabilized by an addition of a heat stabilizer. As a heat stabilizer, those heat stabilizers such as hindered phenols, phosphite esters, etc. can be used and, among all, hindered phenols, particularly, having not less than 180 of molecular weight are preferred. If the molecular weight is lower than the above, the evaporating ratio upon melt processing becomes unpreferably too high.

The amount of the heat stabilizer used based on 100 parts by weight of the PIB is 0.1 to 10 parts by weight and, preferably, 0.2 to 5 parts by weight. The stabilizing effect is insufficient if the amount is less than 0.1 parts by weight, whereas economical disadvantage is resulted if it exceeds 10 parts by weight.

While the heat stabilizer may be added upon blending of PIB and PATE or the filler, it is particularly preferable to add the stabilizer to the PIB prior to the blending with PATE or the filler thereby stabilizing the PIB, in respect to the reliability and the high efficiency.

Filler

The PATE composition according to the present invention may be formed, as it is, into a molded product of excellent toughness and impact resistance by various melt processing methods. However, it is preferred to use the composition in combination with various kind of fillers. As the filler, there can be mentioned fibrous filler, inorganic powdery filler and various kinds of synthetic resins and elastomers.

(i) Fibrous filler

These fibers such as of glass, carbon, graphite, silicon carbide, silica, alumina, zirconia, potassium titanate, calcium sulfate, calcium silicate and aramide, as well as natural fibers such as wollastonite and a mixture thereof are usable for the present invention.

(ii) Inorganic powdery filler

These powders such as of talc, mica, kaolin, clay, diatomaceous earth, magnesium phosphate, magnesium carbonate, calcium carbonate, calcium silicate, calcium sulfate, silicon oxide, aluminum oxide, titanium oxide, chromium oxide, iron oxide, copper oxide, zinc oxide, carbon, graphite, boron fluoride, molybdenum disulfide, silicon and a mixture thereof, can be used for the present invention.

(iii) Synthetic resin and elastomer

These synthetic resins such as polyolefin, polyester, polyamide, polyimide, polyether imide, polycarbonate, polyphenylene ether, polysulfone, polyether sulfone, polyether ether ketone, polyether ketone, polyarylene, polyacetal, polyethylene tetrafluoride, polyethylene difluoride, polystyrene, ABS, epoxy resin, silicone resin, phenol resin and urethane resin, or elastomers such as polyolefinic rubber, fluoro rubber and silicone rubber, are usable for the present invention.

The fibrous fillers exhibit particularly remarkable effect to improve toughness and impact resistance of PATE by a coupling agent-like effect with PIB. The amount of the fibrous filler used is preferably within a range up to 200 parts by weight based on 100 parts by weight of a PATE/PIB composition ((A)+(B)). The amount of the filler used is preferably within a range up to 400 parts by weight based on 100 parts by weight of the PATE/PIB composition ((A)+(B)). If it exceeds 400 parts by weight, it is not preferable either because the melt processing may possibly become difficult.

In the case of using a mixture of the fibrous filler and the inorganic powdery filler, the difficulty or easiness of melt processing of the composition containing the mixed filler is varied and the effect of the addition is also varied depending on the mixing ratio of both fillers even if the same amount of the mixture is added. Thus it is necessary to determine the adding amount of the mixture as a filler depending on the cases on the condition that the melt processing can be performed normally.

The synthetic resin and the elastomer should be blended in such an amount as not undesirably impairing the property of the PATE composition as the resin according to the present invention. Accordingly, it is generally preferred that the their blending amount is not more than the total amount of (A)+(B).

In addition to these fillers, a small amount of auxiliaries such as antioxidant, heat stabilizer, light stabilizer, antirust agent, coupling agent, releasing agent, lubricants, pigments, flame retarding agent, foaming agent and antistatic agent can be added.

Preparation of The Composition

Since PATE is less soluble to usual solvents, the blending of PATE with PIB, other fillers and auxiliaries is preferably performed by a melt kneading process using an extruder or the like upon preparing the composition.

PIB can be blended by a dry process in which PIB is kneaded by itself in a pulverized or finely chopped form and it can be also blended by a wet process in which PIB is dissolved once in an organic solvent to make a solution, then mixed with PATE, removed the solvent and then subjected to melt kneading.

The typical PATE composition of the present invention is the one which resin component, that is, total of (A), (B), a synthetic resin and an elastomer, is in a coherent state via a molten state.

Molded Product

The PATE composition according to the present invention can provide a molded product of tough and high impact resistant by way of injection molding, extrusion molding, compression molding, blow molding, etc. It can be used for various molded products such as encapsulated molding product, various kinds of molded articles, or sheets, films, plates, pipes, rods, profiles, bottles, etc.

EXPERIMENTAL EXAMPLE

Synthesis Experimental Example 1:

Into a titanium-lined autoclave, 423.2 kg of hydrous sodium sulfide (solid content, 46.13%) and 927 kg of N-methyl-pyrrolidone (hereinafter referred to as NMP) were charged and temperature was elevated to about 203° C., to distill out 167 kg of water. 65.4 kg of NMP was further added (total water amount/NMP=3.5 mol/kg).

Then, 365.0 kg of p-dichlorobenzene was charged (total arylene group/NMP=2.5 mol/kg).

After reacting at 220° C. for 5 hours, 92.5 kg of water was further added (total water amount/NMP=8.75 mol/kg). Then, the content was polymerized at 265° C. for 0.75 hour and at 254° C. for 4 hours.

The reaction mixture was sieved through a 0.1 mm mesh screen and only the granular polymer was separated and washed with acetone and then with water to obtain a washed polymer.

The washed polymer was immersed in an aqueous 2% $NH_4Cl$ solution, treated at 40° C. for 30 minutes, washed with water and dried at 80° C. under a reduced pressure to obtain a polymer A. The melt viscosity of the polymer A (temperature=310° C., sharing rate=200 sec$^{-1}$) was 1600 poise.

Synthesis Experimental Example 2:

Into a titanium-lined autoclave, 372.6 kg of hydrous sodium sulfide (solid content, 46.09%) and 1035 kg of NMP were charged and temperature was elevated to about 203° C., to distill out 145.4 kg of water. 2.9 kg of water and 34.8 kg of NMP were further added (total water amount/NMP =3.0 mol/kg). Then, 290.0 kg of p-dichlorobenzene was charged (total arylene group/NMP=2.26 mol/kg).

After reacting at 210° C. for 5 hours and 220° C. for 3 hours, 77.1 kg of water was further added (total water amount/NMP =7.0 mol/kg). Then, the contents were polymerized at 258° C. for 1.5 hours.

The reaction mixture was sieved through a 0.1 mm mesh screen and only the granular polymer was separated, washed with acetone and then with water to obtain a washed polymer.

The washed polymer was immersed in an aqueous 2% $NH_4Cl$ solution, treated at 40° C. for 30 minutes, washed with water and dried at 80° C. under a reduced pressure to obtain a polymer B. The melt viscosity of the polymer B (temperature=310° C., sharing rate=10000 sec$^{-1}$) was 35 poise.

EXAMPLE 1

As the modifier, the followings were used:
(1) SBR type rubber ("TOUGHPRENE A", registered trademark of the product manufactured by Asahi Kasei Kogyo Co.)
(2) NBR type rubber ("ZETPOLE 2020", registered trademark of the product manufactured by Nihon Zeon Co.)
(3) Olefinic type rubber ("TAFMER-A", registered trademark of the product manufactured by Mitsui Sekiyu Kagaku Co.)
(4) Acrylic type rubber ("PARALOID KM-330", registered trademark of the product manufactured by Rohm and Haas Co. in U.S.A.)
(5) PIB-A ("VISTANEX-MML-140", registered trademark of the product manufactured by Exson chemical Co. average molecular weight : about 12,500)
(6) PIB-B ("VISTANEX-MML-80", registered trademark of the product manufactured by Exson chemical Co. average molecular weight : about 72,000)
(7) PIB-C ("ESSOBUTYL-#065", registered trademark of the product manufactured by Ecson chemical Co. average molecular weight : about 350,000)

As the fibrous fillers, the followings were used.
(1) Glass fiber A (10 μm in diameter) ("CS03J-942CB", the product manufactured by Nittobo Co.)
(2) Glass fiber B (6 μm in diameter) ("ECS03-T-717DE", the product manufactured by Nippon Denki Glass Co.).

For each of the samples of PIB, "IRGANOX #246"(registered trademark of the product manufactured by Ciba Geigy as a stabilizer was added 2 phr and it was roll-kneaded respectively to obtain a stabilized PIB.

Each of the modifiers was frozen and pulverized by using a mill and melt-kneaded with the polymer A obtained in the Synthesis Experimental Example 1. Upon melt-kneading, a predetermined amount of each of the modifiers was added to 100 parts by weight of the polymer A. Further, 0.1 parts by weight of Ca(OH)$_2$, 0.1 parts by weight of N-phenyl-Y-aminopropyl triethoxysilane and 66.7 parts by weight of glass fiber A were added to 100 parts by weight of the composition (PATE of polymer A + each of the modifiers), which were uniformly dry-blended by using a Henschel mixer, supplied to a single-screwed kneading extruder, melt-kneaded at 310° C., extruded into a strand-like form and then cut to obtain pellets of respective compositions.

Each of the pellets was injection molded at 290–320° C. by using an injection molding machine to obtain a test piece for the measurement of physical property.

For evaluating the toughness and the impact resistance for the obtained test pieces, the maximum flexural distortion and izod impact strength were measured according to the method of ASTM D-790 and the method of ASTM D-256 respectively. At the same time, for evaluating the heat resistance, the heat distortion temperature (HDT) was measured according to the method of ASTM D-648. The results are collectively shown in Table 1.

Further, photographs of the flactured cross section of the test pieces for the izot impact strength of experimental code numbers 1, 3, 5 and 9 were taken by a scanning type electron microscopic photography and after studying them it was found that polyisobutylene was mainly existing at the surface of the glass fibers to improve the adhesion between the fibers and PATE in the case of the molded product containing PATE, PIB and glass fibers according to the present invention.

EXAMPLE 2

5 parts by weight of a stabilized PIB pulverizate prepared in Example 1 was added to 100 parts by weight of the polymer B obtained in the Synthesis Experimental Example 2 and, further, 0.1 part by weight of Ca(OH)$_2$ and 25 parts by weight of glass fiber B were uniformly mixed with 100 parts by weight of the composition (PATE of polymer B + PIB) by using a Henschel mixer, and the mixture was supplied to a twin-screwed kneading extruder and melt-kneaded at 310° C. to obtain molded product in a pellet farm. The pellet was supplied to an encapsulating injection molding machine ("JT-40S", manufactured by Nihon Seikosho Co.) and subjected to encapsulation molding by using an IC lead frame.

After dipping the obtained encapsulated molded product in an red ink at 150° C. for 20 hours, the molded product was cut open to observe the degree of penetration of the red ink to the inside of the encapsulated molded product. For the comparison, the composition with no PIB addition was also subjected to encapsulation molding and applied the red ink intrusion test.

As a result, some intrusion of the red ink was observed to the inside of the encapsulation molded product obtained with the composition containing no PIB, while no substantial intrusion of the red ink was observed to the inside of the product incorporated with PIB.

EXAMPLE 3

Injection molded products prepared according to the method of code numbers 1 and 5 of Example 1, provided that 3.0 parts by weight of CaCO$_3$ was added to 100 parts by weight of the polymer A only or (polymer A + PIB-B) composition, were obtained.

The toughness, the impact resistance and the heat resistance of the molded products of polymer A and (polymer A + PIB-B) composition were measured and the results are as follows:

|  | Polymer A | Polymer A + PIB-B |
|---|---|---|
| Maximum flexural distortion (mm): | 5.0 | 8.3 |
| Izot impact strength (kg · cm/cm): | 6.0 | 10.2 |
| HDT (°C.): | 257 | 255 |

TABLE 1

| Code No. | Modifier (parts by weight) (*1) | Maximum flexural distortion (mm) | Izod strength (V notch) (kg · cm/cm) | HDT (*2) (°C.) | Remarks |
|---|---|---|---|---|---|
| 1 | — | 6.0 | 7.0 | 255 | Control |
| 2 | PIB-A(5) | 8.6 | 10.0 | 255 | Example |
| 3 | PIB-A(10) | 9.5 | 10.9 | 253 | " |
| 4 | PIB-B(5) | 8.6 | 10.1 | 255 | " |
| 5 | PIB-B(10) | 9.5 | 11.4 | 253 | " |
| 6 | PIB-C(10) | 8.2 | 10.5 | 254 | " |
| 7 | SBR type rubber (10) | 6.1 | 5.8 | 250 | Comparative Example |
| 8 | NBR type rubber (10) | 6.1 | 5.7 | 250 | Comparative Example |
| 9 | Olefinic type rubber (10) | 6.6 | 7.6 | 253 | Comparative Example |
| 10 | Acrylic type rubber (10) | 6.6 | 7.9 | 253 | Comparative Example |

(*1) per 100 parts by weight of PATE of polymer A
(*2) sample thickness 3 mm

What is claimed is:
1. A polyarylene thioether composition comprising the following ingredients (A), (B) and (C):
(A) 100 parts by weight of polyarylene thioether having the repeating unit of

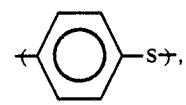

(B) from 3–30 parts by weight of polyisobutylene having the repeating unit of $-(CH_2C(CH_3)_2)-$, (C) from 25 to 200 parts by weight, based on 100 parts by weight of (A)+(B), of a glass fiber.

2. The polyarylene thioether composition according to claim 1, wherein said ingredient (A) is a substantially linear polyarylene thioether containing not less than 60 mol% of the repeating unit of

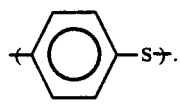

3. The polyarylene thioether composition according to claim 1, wherein said ingredient (A) is a polyarylene thioether comprising a copolymer containing from 60 to 95 mol% of the repeating unit of

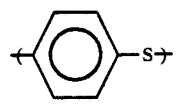

and from 40 to 5 mol% of the repeating unit of

4. The polyarylene thioether composition according to claim 1, wherein said ingredient (A) is a polyarylene thioether comprising a copolymer containing from 60 to 95 mol% of the repeating unit of

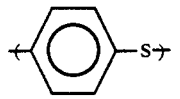

and from 40 to 5 mol% of the repeating unit of

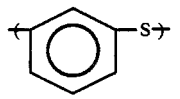

in which said respective repeating unit is contained in the block form.

5. The polyarylene thioether composition according to claim 1, wherein said ingredient (B) is polyisobutylene containing not less than 60 mol% of the repeating unit of $-(CH_2C(CH_3)_2)-$.

6. The polyarylene thioether composition according to claim 1, wherein said ingredient (B) is polyisobutylene containing not more than 5 mol% of aliphatic double bonds.

7. A molded product comprising a polyarylene thioether composition comprising the following ingredients (A), (B) and (C):

(A) 100 parts by weight of polyarylene thioether having the repeating unit of

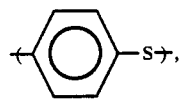

(B) from 3-30 parts by weight of polyisobutylene having the repeating unit of $-(CH_2C(CH_3)_2)-$, (C) from 25 to 200 parts by weight, based on 100 parts by weight of (A)+(B), of a glass fiber.

8. The molded product according to claim 7, wherein said ingredient (A) is substantially linear polyarylene thioether containing not less than 60 mol% of the repeating unit of

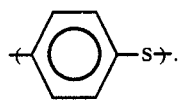

9. The molded product according to claim 7, wherein said ingredient (A) is a polyarylene thioether comprising a copolymer containing from 60 to 95 mol% of the repeating unit of

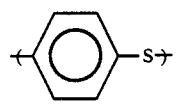

and from 40 to 5 mol% of the repeating unit of

in which said respective repeating units are contained in the block form.

10. The molded product according to claim 7, wherein said ingredient (B) is polyisobutylene containing not less than 60 mol% of the repeating unit of $-(CH_2C(CH_3)_2)-$.

11. The molded product according to claim 7, wherein said ingredient (B) is polyisobutylene containing not more than 5 mol% of aliphatic double bonds.

* * * * *